Figure 1:
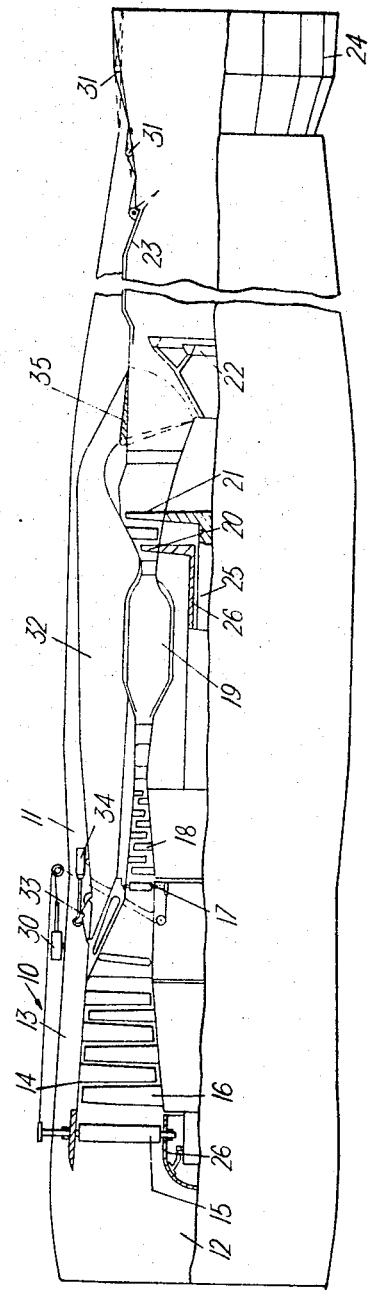

United States Patent Office 3,280,564
Patented Oct. 25, 1966

3,280,564
GAS TURBINE POWER PLANT
John Gregory Keenan, Derby, Jack Palfreyman, Tansley, and John Bertram Holliday, Derby, England, assignors to Rolls-Royce Limited, Derby, England, a company of Great Britain
Filed Dec. 6, 1963, Ser. No. 328,661
Claims priority, application Great Britain, Dec. 17, 1962, 47,628/62
9 Claims. (Cl. 60—244)

This invention concerns a gas turbine power plant which may, when necessary, be used as a ram-jet engine.

When a gas turbine engine is used at a high supersonic speed, the outlet from the low pressure compressor of the engine tends to become choked.

According to the present invention, there is therefore provided gas turbine power plant having a flow duct which is provided in flow series with an air intake passage, compressor means, primary combustion equipment, turbine means, reheat combustion equipment and an exhaust passage; a supplementary air duct which communicates with the air intake passage so as to be adapted to receive ram air therefrom and which communicates with said exhaust passage, said supplementary air duct by-passing the compressor means, primary combustion equipment, turbine means, and reheat combustion equipment; and a ram air duct which communicates by way of valve means with the supplementary air duct, the said valve means being settable in first and second positions in which ram air flowing through the supplementary air duct is respectively directed into and prevented from entering the ram air duct, the ram air duct communicating with the said flow duct upstream of the reheat combustion equipment so as to be adapted to deliver ram air thereto, whereby when the said valve means is set in the said first position and the said primary combustion equipment is shut down, the power plant may be operated as a ram-jet engine, while when the said valve means is set in the said second position, the power plant may be operated as a gas turbine engine in which the ram air passing into the exhaust passage from the supplementary air duct will control the expansion in the exhaust passage of the exhaust gases.

It will be appreciated that, in the case of gas turbine power plant according to the present invention, the air intake and exhaust passages may be designed for the large flows of air which will occur at high supersonic speeds. At Mach 1, when the power plant will be used as a gas turbine engine, the air intake passage may perhaps receive three to four times as much air as is required for gas turbine operation. This excess air, however, will merely pass through the supplementary air duct and will flow into the exhaust passage where it will prevent over-expansion therein of the exhaust gases.

Flow control means, operable when required, are preferably provided for preventing flow from the air intake passage and through the compressor means.

Thus the compressor means may be provided with movable inlet guide vanes which constitute the flow control means, means being provided to effect movement of the movable inlet guide vanes between open and closed positions. The compressor means may, for example, comprise a low pressure compressor and a high pressure compressor each of which is provided with said movable inlet guide vanes.

Alternatively, the compressor means may be provided at its upstream end with a member which is mounted coaxially of the compressor means and which controls the flow of air thereinto, the said member having a plurality of relatively movable portions which may be moved relatively away from and towards each other to positions in which they respectively prevent and permit flow of air into the compressor means.

Valve means are preferably provided for controlling flow from the ram air duct to the reheat combustion equipment.

Valve means are also preferably provided for controlling flow from the supplementary air duct and into the exhaust passage. The last-mentioned valve means may, for example, comprise pivotally mounted flap members.

The gas turbine engine may comprise a non by-pass engine or may comprise a by-pass engine whose by-pass duct constitutes the said ram air duct.

Preferably at least part of the said flow duct has a double-walled casing, means being provided for passing a cooling fluid between the walls of said casing.

Figure 2:
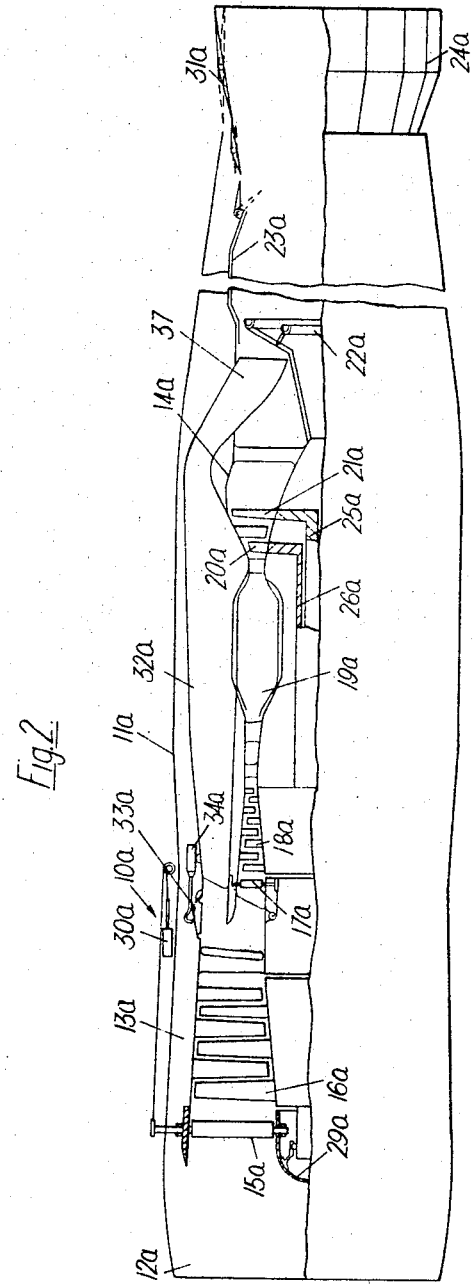

The invention is illustrated, merely by way of example in the accompanying drawings in which:

FIG. 1 is a diagrammatic part-sectional side view of one embodiment of a gas turbine power plant according to the present invention, and FIG. 2 is a view similar to FIG. 1, but illustrating another embodiment of the present invention.

Referring first to FIG. 1, a gas turbine power plant 10 adapted for use on a supersonic aircraft has an outer casing 11 provided at its upstream end with an air intake passage 12.

Mounted within the outer casing 11, and spaced therefrom by an annular supplementary air duct 13 is a double-walled inner casing 14. Within the inner casing 14 there is a main flow duct in which are mounted in flow series low pressure compressor inlet guide vanes 15, a low pressure compressor 16, high pressure compressor inlet guide vane 17, a high pressure compressor 18, primary combustion equipment 19, a high pressure turbine 20, a low pressure turbine 21, and reheat combustion equipment 22, the exhaust gases being directed to atmosphere through an exhaust passage 23 whose downstream end is provided with a nozzle 24.

The low pressure compressor 16 and the low pressure turbine 21 are mounted on a shaft 25 which is mounted coaxially within a shaft 26 on which are mounted the high pressure compressor 18 and the high pressure turbine 20.

Part, or all, of the inner casing 14 may be cooled by passing therethrough (by means not shown) a flow of ram air which has been expanded, and thereby cooled, by a ram air turbine (not shown) which may also be employed to drive a reheat fuel pump (not shown).

The inlet guide vanes 15, 17 are rotatably mounted, the inlet guide vanes 15 being rotatably mounted in a bullet-shaped nose cone 29 which is mounted coaxially of the compressor 16 and which controls the flow of air thereinto. The inlet guide vanes 15, 17 are arranged to be rotated by a common ram 30 between open positions, in which air may flow through the compressors 16, 18, and closed positions, in which flow of air through the compressors 16, 18 is prevented.

The supplementary air duct 13, which is adapted to receive ram air from the air intake passage 12, by-passes the compressor 16, 18, primary combustion equipment 19, turbines 20, 21 and reheat combustion equipment 22, the downstream end of the supplementary air duct 13 communicating with the exhaust passage 23, adjacent the nozzle 24, by way of a series of pivotally mounted flap valves 31 some of which collectively constitute the nozzle 24. The flap valves 31 may be moved (by means not shown) between a full line position in which they blank off the downstream end of the supplementary air duct 13 and a dotted line position in which they permit ram air flowing through the supplementary air duct 13 to pass into the exhaust passage 23.

An annular ram air duct 32, which is disposed inwardly of the supplementary air duct 13, surrounds the high pressure compressor 18, primary combustion equipment 19, and turbines 20, 21.

The upstream end of the ram air duct 32 is adapted to receive ram air from the supplementary air duct 13. Communication between the ducts 13, 32 is controlled by a valve device 33. The valve device 33 may be moved by a ram 34 between a position (which is shown in FIG. 1) in which no ram air is passed to the ram air duct 32 and another position (not shown) in which all the ram air flowing through the supplementary air duct 13 is passed into the ram air duct 32.

The downstream end of the ram air duct 32 is adapted to deliver ram air flowing therethrough to the interior of the inner casing 14 immediately upstream of the reheat combustion equipment 22. Communication between the ram air duct 32 and the duct within the inner casing 14 is controlled by a flap valve device 35. The latter may be moved (by means not shown) between the full line position, in which the downstream end of the ram air duct 32 will be blanked off, and the dotted line position, in which ram air may flow from the ram air duct 32 to support combustion at the reheat combustion equipment 22.

In operation, at supersonic speeds of, for example, Mach 2.6 and above, the inlet guide vanes 15, 17 are closed by the ram 30 to prevent flow through the compressor 16, 18, the primary combustion equipment 19 is shut down, the valve device 33 is disposed in the position in which ram air from the supplementary air duct 13 passes to the ram air duct 32, the flap valve device 35 is disposed in the dotted line position shown in FIG. 1, the flap valves 31 are disposed in the full line position shown in FIG. 1 and the reheat combustion equipment 22 is brought into operation, whereby the power plant will be operated only as a ram jet engine.

At speeds below, for example, Mach 2.6, the inlet guide vanes 15, 17 are opened by the ram 30, to permit flow through the compressors 16, 18, the primary combustion equipment 19 is maintained in operation (as may also be the reheat combustion equipment 22, if so desired) the valve device 33 is disposed in the position shown in FIG. 1, the flap valve device 35 is disposed in the full line position, and the flap valves 31 are disposed in the dotted line position. The power plant will, in these circumstances be operated only as a gas turbine engine and although the air intake passage 12 will pass very much more air than is required for gas turbine operation, this excess air will merely pass through the supplementary air duct 13 and will be supplied to the nozzle 24 where it will prevent overexpansion of the exhaust gases.

In FIG. 2 there is shown a gas turbine power plant 10a which will not be described in detail since it is closely similar to that of FIG. 1. Parts of the power plant of FIG. 2 which are similar to those of FIG. 1 are given the same reference numerals with the addition of the suffix a.

The power plant 10a, however, in contrast to the power plant 10, comprises a by-pass gas turbine engine, the ram air duct 32a constituting the by-pass passage of the engine. Moreover, the downstream end of the ram air duct 32a is not provided with a flap valve device but is formed into a plurality of angularly spaced apart chutes 37 which extend into the inner casing 14a immediately upstream of the reheat combustion equipment 22a. Means (not shown) may, if desired, be provided for altering the effective cross sectional areas of the chutes 37 in accordance with whether they are receiving by-pass or ram air.

If desired, instead of employing inlet guide vanes 15, 17 or 15a, 17a to control flow of air through the compressors, the nose cone 29 or 29a may be made (as suggested in our co-pending British patent application No. 11,526/62) of a plurality of relatively movable portions (not shown) which may be moved relatively away from and towards each other to positions in which they respectively prevent and permit flow of air into the compressor means.

We claim:

1. Gas turbine power plant having a flow duct which is provided in flow series with an air intake passage, compressor means, primary combustion equipment, turbine means, reheat combustion equiment and an exhaust passage; a supplementary air duct having an upstream portion which communicates with the air intake passage so as to be adapted to receive ram air therefrom and a downstream portion which communicates with said exhaust passage downstream of the reheat combustion equipment; a ram air duct; valve means in said supplementary air duct, and means for setting the said valve means selectively in a first position in which ram air flowing through the upstream portion of the supplementary air duct is directed into the ram air duct and flow of ram air through the downstream portion of the supplementary air duct is prevented and a second position in which ram air flowing through the upstream portion of the supplementary air duct flows into the downstream portion thereof, and flow of ram air into the ram air duct is prevented, the ram air duct communicating with the said flow duct upstream of the reheat combustion equipment, whereby when the said valve means is set in the said first position and the said primary combustion equipment is shut down, the power plant may be operated as a ram-jet engine, ram air being supplied through the ram air duct, while when the said valve means is set in the said second position, the power plant may be operated as a gas turbine engine in which ram air passes into the exhaust passage from the downstream portion of the supplementary air duct to control the expansion in the exhaust passage of the exhaust gases.

2. Gas turbine power plant as claimed in claim 1 and further comprising flow control means operable when required for preventing flow from the air intake passage and through the compressor means.

3. Gas turbine power plant as claimed in claim 2 in which the flow control means comprise movable inlet guide vanes for preventing flow from the air intake passage and through the compressor means, and means for effecting movement of the movable inlet guide vanes between open and closed positions.

4. Power plant as claimed in claim 2 in which the compressor means comprise a low pressure compressor and a high pressure compressor each of which is provided with respective flow control means operable when required for preventing flow through the respective compressors.

5. Gas turbine power plant as claimed in claim 1 and further comprising valve means for controlling flow from the ram air duct into the said flow duct upstream of the reheat combustion equipment.

6. Gas turbine power plant as claimed in claim 1 and including further valve means for controlling flow from the supplementary air duct and into the exhaust passage downstream of the reheat combustion equipment.

7. Power plant as claimed in claim 6 in which the said further valve means comprise pivotally mounted flap members.

8. Gas turbine by-pass engine having a flow duct which is provided in flow series with an air intake passage, compressor means, primary combustion equipment, turbine means, reheat combustion equipment and an exhaust passage; a supplementary air duct which communicates with the air intake passage so as to be adapted to receive ram air therefrom and which communicates with said exhaust passage, said supplementary air duct by-passing the compressor means, primary combustion equipment, turbine means, and reheat combustion equipment; a by-pass duct which communicates with the compressor means; and valve means through which the by-pass duct communicates with the supplementary air duct, the said valve means being settable in first and second poistions in which ram air flowing through the supplementary air duct is respectively directed into and prevented from entering the by-pass duct, the by-pass duct communicating with the said flow duct upstream of the reheat combustion equipment, so as to be adapted to deliver ram air thereto, whereby when the said valve means is set in the said first position and the said primary combustion equipment is shut down, the power plant may be operated as a ram-jet engine, while when the said valve means is set in the said second position, the power plant may be operated as a gas turbine engine in which the ram air passing into the exhaust passage from the supplementary air duct will control the expansion in the exhaust passage of the exhaust gases.

9. Gas turbine by-pass engine having a flow duct which is provided in flow series with an air intake passage, compressor means, primary combustion equipment, turbine means, reheat combustion equipment and an exhaust passage; a supplementary air duct which communicates with the air intake passage so as to be adapted to receive ram air therefrom and which communicates with said exhaust passage, said supplementary air duct by-passing the compressor means, primary combustion equipment, turbine means, and reheat combustion equipment; flow control means operable when required for preventing flow from the air intake passage and through the compressor means; valve means for controlling flow from the supplementary air duct and into the exhaust passage; a by-pass duct which communicates with the compressor means; valve means through which the by-pass duct communicates with the supplementary air duct, the said valve means being settable in first and second positions in which ram air flowing through the supplementary air duct is respectively directed into and prevented from entering the by-pass duct, the by-pass duct communicating with the said flow duct upstream of the reheat combustion equipment, so as to be adapted to deliver ram air thereto; and valve means for controlling flow from the by-pass duct to the reheat combustion equipment; whereby when the said valve means is set in the said first position and the said primary combustion equipment is shut down, the power plant may be operated as a ram-jet engine, while when the said valve means is set in the said second position, the power plant may be operated as a gas turbine engine in which the ram air passing into the exhaust passage from the supplementary air duct will control the expansion in the exhaust passage of the exhaust gases.

References Cited by the Examiner

UNITED STATES PATENTS

| | | | |
|---|---|---|---|
| 2,984,068 | 5/1961 | Eatock | 60—35.6 |
| 3,091,082 | 5/1963 | Newcomb et al. | 60—35.6 X |
| 3,107,690 | 10/1963 | Pope et al. | 60—35.6 |
| 3,118,276 | 1/1964 | Keenan et al. | 60—35.6 |
| 3,153,904 | 10/1964 | Ellis et al. | 60—35.6 X |
| 3,161,018 | 12/1964 | Sandre | 60—35.6 |

FOREIGN PATENTS 1,159,986   2/1958   France.

MARK NEWMAN, *Primary Examiner.*

D. HART, *Assistant Examiner.*